Oct. 6, 1931.   G. S. SMITH   1,825,891
WINDSHIELD WIPER ATTACHMENT
Filed May 31, 1930   2 Sheets-Sheet 1
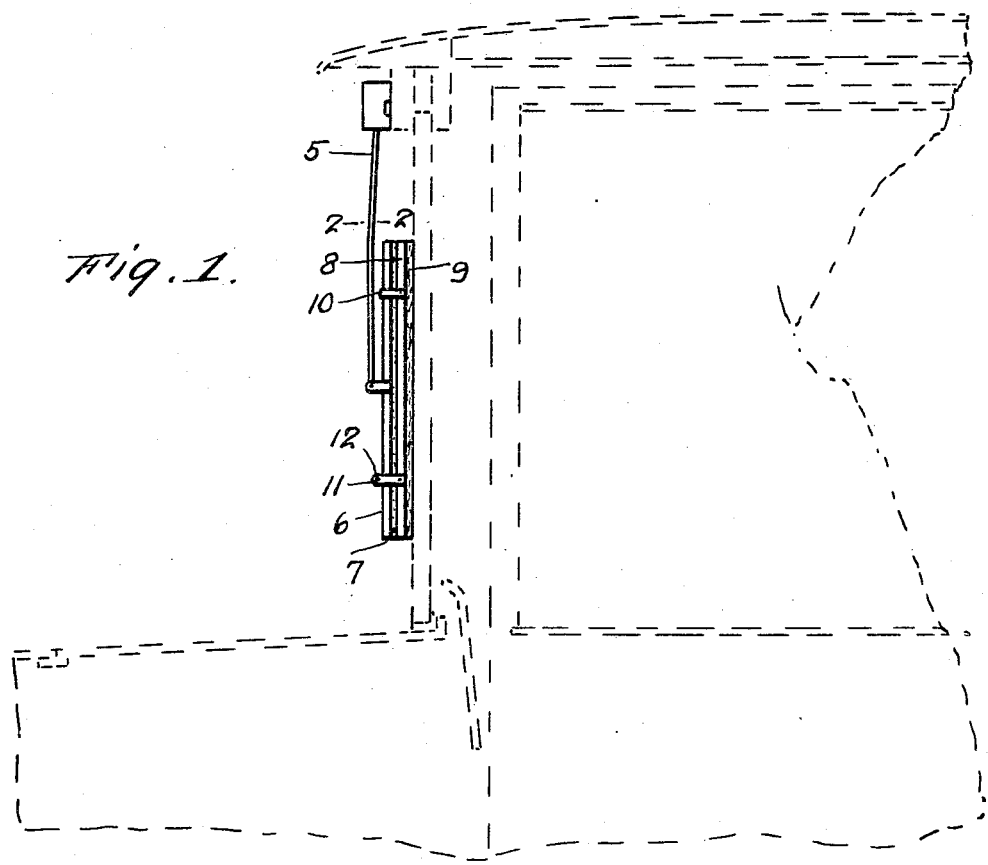
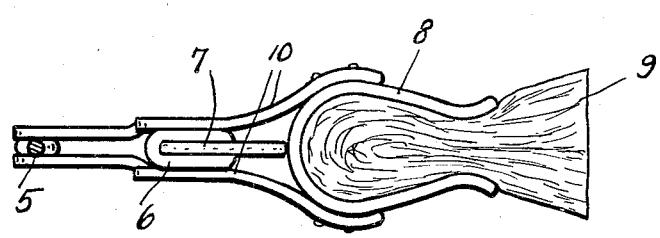
Inventor
George S. Smith
By *Clarence A. O'Brien*
Attorney Oct. 6, 1931.  G. S. SMITH  1,825,891
WINDSHIELD WIPER ATTACHMENT
Filed May 31, 1930  2 Sheets-Sheet 2
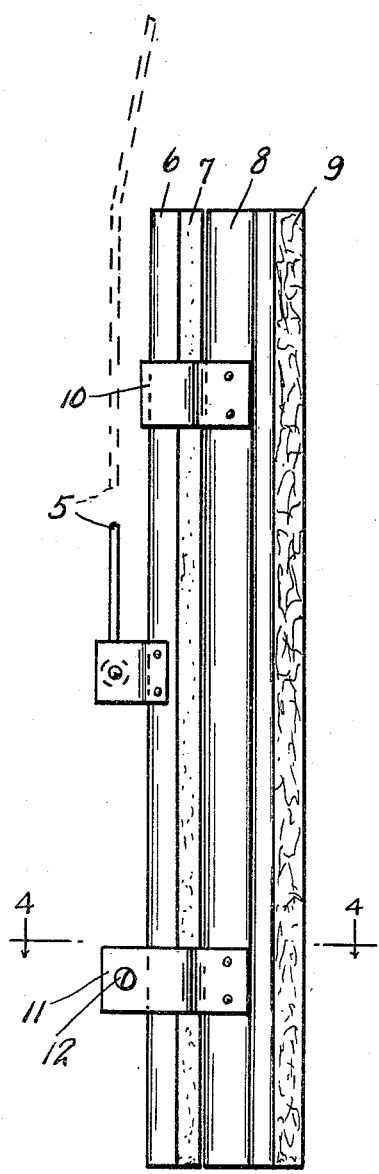
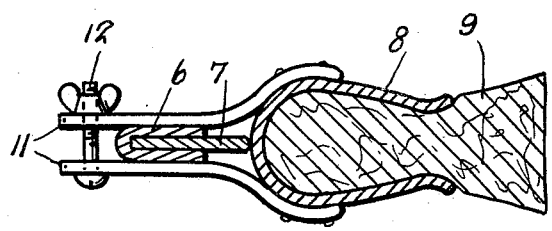
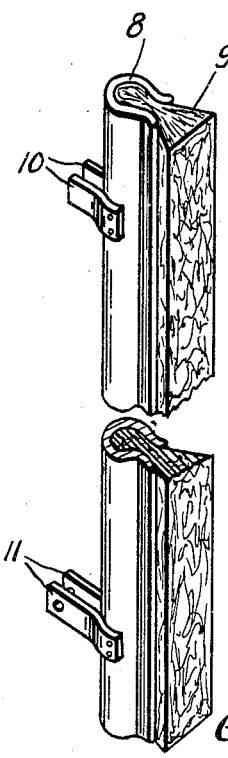
Inventor
George S. Smith
By Clarence A. O'Brien
Attorney Patented Oct. 6, 1931

1,825,891

UNITED STATES PATENT OFFICE

GEORGE S. SMITH, OF EDWARDSVILLE, ILLINOIS

WINDSHIELD WIPER ATTACHMENT

Application filed May 31, 1930. Serial No. 458,373.

The present invention relates to an attachment for windshield wipers and has for its prime object to provide an attachment which may be easily engaged with and disengaged from the windshield wiper and is particularly adapted for use in cold weather to remove from and prevent the formation on the windshield of ice.

A still further very important object of the invention resides in the provision of an attachment of this nature which is exceedingly simple in its construction, inexpensive to manufacture, strong and durable, thoroughly efficient and reliable in use, and otherwise well adapted to the purpose for which it is intended.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the attachment showing the same on a windshield wiper, Figure 2 is a sectional view taken substantially on the line 2—2 of Figure 1 looking downwardly, Figure 3 is an enlarged detail side elevation of a squeegee with the attachment thereon, Figure 4 is a transverse horizontal section taken substantially on the line 4—4 of Figure 3, and Figure 5 is a perspective view of the attachment.

Referring to the drawings in detail it will be seen that the numeral 5 denotes the arm of a windshield wiper which supports the well known form of squeegee holder 6 with squeegee 7 mounted therein. My attachment comprises a channelled shaped holder 8 with a wick 9 disposed therein which may be constructed of compressed felt or the like and is adapted to be saturated with a chemical or a solution such as alcohol and glycerine.

A pair of straps 10 are fixed to the sides of the upper portion of the holder 8 to extend rearwardly therefrom for straddling the holder 6. A second pair of straps 11 are similarly secured to the lower portion of the holder 8 and straddle the lower portion of the holder 6 and extend therebeyond so that a bolt, screw or like fastening element 12 may be engaged between the ends of the strap 11 to clamp them securely to the holder 6 which will be sufficient, with the cooperation of the strap 10 to maintain the attachment on the wiper so as to cause the wick to be moved in an arc across the windshield and spread the alcohol and glycerine on the surface which, of course, prevents freezing of snow, rain and the like in cold weather as is well known.

It is thought that the construction, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. An attachment of the class described including an elongated holder of U-shaped cross section, a wick in the open side of the holder, a pair of straps secured to the sides of the holder adjacent one end, a second pair of straps similarly secured to the holder adjacent the other end said second pair of straps having openings in the ends thereof, and a bolt through said openings for clamping said straps to a windshield wiper.

2. A windshield wiper attachment of the class described comprising an elongated rigid casing having one longitudinal side open, a wick in said casing disposed to protrude outwardly from said open side, a pair of outside brackets on the upper portion of the casing, another pair of outside brackets on the lower portion of the casing, said brackets adapted to embrace the squeegee carrier of a windshield wiper, and one of said pairs of brackets provided with clamping means for fastening the attachment to the squeegee carrier.

In testimony whereof I affix my signature.

GEORGE S. SMITH.